United States Patent
Albrecht et al.

(10) Patent No.: US 8,354,053 B2
(45) Date of Patent: Jan. 15, 2013

(54) BLOW MOULDING MACHINE HAVING A COOLING DEVICE

(75) Inventors: Thomas Albrecht, Beilngries (DE); Erik Blochmann, Neutraubling (DE)

(73) Assignee: Krones AG (DE)

( * ) Notice: Subject to any disclaimer, the term of this patent is extended or adjusted under 35 U.S.C. 154(b) by 83 days.

(21) Appl. No.: 12/964,507

(22) Filed: Dec. 9, 2010

(65) Prior Publication Data

US 2011/0140315 A1     Jun. 16, 2011

(30) Foreign Application Priority Data

Dec. 11, 2009  (DE) .......................... 10 2009 057 891

(51) Int. Cl.
*B29C 49/58* (2006.01)
*B29C 49/64* (2006.01)

(52) U.S. Cl. .......... 264/523; 249/79; 249/111; 425/526; 425/535

(58) Field of Classification Search .................. 425/526, 425/535; 249/79, 111; 264/523
See application file for complete search history.

(56) References Cited

U.S. PATENT DOCUMENTS

| | | | | |
|---|---|---|---|---|
| 615,910 A | * | 12/1898 | Rott et al. | 249/79 |
| 3,048,889 A | * | 8/1962 | Fischer et al. | 425/526 |
| 3,838,997 A | * | 10/1974 | Becker et al. | 425/526 |
| 5,975,880 A | * | 11/1999 | Takada et al. | 425/526 |
| 6,572,813 B1 | * | 6/2003 | Zhang et al. | 264/519 |
| 2010/0310704 A1 | | 12/2010 | Rousseau et al. | 425/525 |

FOREIGN PATENT DOCUMENTS

| | | |
|---|---|---|
| DE | 2348327 | 4/1974 |
| DE | 102009056556 | 6/2011 |
| JP | 58217328 | 12/1983 |
| JP | 09123256 | 5/1997 |
| WO | 2009/081027 | 7/2009 |
| WO | WO 2009/081027 | 7/2009 |

OTHER PUBLICATIONS

German Search Report dated Sep. 30, 2011 issued in German Application Serial No. 10 2009 057 891.9 (5 pgs).

* cited by examiner

*Primary Examiner* — Robert B Davis
(74) *Attorney, Agent, or Firm* — Hayes Soloway P.C.

(57) ABSTRACT

An apparatus for molding plastic preforms into plastic containers having at least one blow mold, within which the plastic preforms may be expanded into plastic containers is described. The blow mold has at least two blow mold parts which are movable relative to each other, including an application device which is movable relative to the blow mold, in order to apply pressure onto the plastic preform for the expansion thereof; wherein at least one area of the blow mold may be tempered. The apparatus has a tempering body which may be separated from the blow mold in its entirety for tempering the area of the blow mold.

16 Claims, 4 Drawing Sheets

BLOW MOULDING MACHINE HAVING A COOLING DEVICE

BACKGROUND OF THE INVENTION

The present invention relates to a blow moulding machine. Such blow moulding machines are known from the prior art. They are used for expanding plastic preforms into plastic containers in particular by applying pressurised air. To this end a preform, which as a rule has been preheated is placed in the corresponding blow mould and is subsequently expanded by means of pressurised air against the internal wall of this blow mould. Here, these plastic preforms already have a finished thread and only the bottom and the central area are expanded by applying pressurised air.

The area immediately below the thread is therefore a relatively sensitive area, especially when the plastic preforms are also expanded by means of a stretching rod. It is therefore known from the prior art that blow moulds include cooling means in order to cool in particular the neck area of the plastic preform during the expansion process. As a rule, such blow moulds also have so-called neck plates, on the inside of which there are drilled cooling channels. A cooling medium flows through these cooling channels, which cooling medium cools the neck area of the plastic preform during a working operation.

The neck plate including these cooling channels and the corresponding coolant connections are located on the blow mould. In today's embodiment, said bores need to be introduced into the neck plate, as a result of which the neck plate becomes more complex to produce and cannot be standardised. Also, some of the bores will subsequently have to be closed with plugs, which may also lead to leaks. The neck plate continues to have a relatively great thickness due to the cooling bore diameter and the media connections. Also the geometry of these bores has to be accurately adapted to the respective cross section of the neck of the plastic preform. Apart from that, this embodiment is also largely dependent on the geometric conditions, the shape and the neck diameter. This is in conflict with an optimum design.

If, for example, the blow moulds are changed in the course of a change of the tooling set, it is also necessary to replace the corresponding neck cooling assembly at the same time. For this reason, in the case of a mould change, also the connections need to be actuated via couplings.

From WO 2009/081 027, a blow mould for producing thermoplastic containers and a blow moulding system having such a blow mould are known. Here, a neck plate is provided which is to effect a direct cooling of the plastic preform, but at the same time is supposed to achieve a thermal insulation from the blow mould by means of insulating bodies. This heat sink has here a coolant connection and is screwed onto the blow mould.

The present invention is therefore based on the object of simplifying such blow moulding machines in particular also in the case of a blow mould change.

SUMMARY OF THE INVENTION

An apparatus according to the invention for moulding plastic preforms into plastic containers includes at least one blow mould, within which the plastic preforms can be expanded into plastic containers. Here, the blow mould has at least two blow mould parts which may be moved relative to each other, with a cavity for expanding the plastic preforms being formed especially within these blow mould parts. Further, application means, which are movable relative to the blow mould, are provided in order to apply pressure onto the plastic preform for the expansion thereof. Here, at least one area of the blow mould is designed to be tempered.

According to the invention, the apparatus comprises a tempering body which may be separated from the blow mould in its entirety, in order to temper said area of the blow mould and/or the plastic preform.

Whilst, as described above, coolant channels have so far been provided either in the blow mould itself or in the corresponding neck plate fastened to the blow mould, which coolant channels cool the holding area of the preform, it is now suggested to provide a tempering body which may be separated itself from the blow mould or from a neck plate. In this way it becomes possible for the blow moulds themselves to be exchanged whilst said tempering body remains on the apparatus or on a blow mould carrier. If the tempering body includes coolant connections, these will no longer have to be exchanged in the case of a blow mould change. In this way, in particular any present neck plate and said tempering body are separate components.

Preferably, the blow mould parts are pivotable relative to one another or at least one blow mould part is pivotable relative to the other. Advantageously, this pivotability is provided relative to an axis which extends parallel to a longitudinal axis of the plastic preforms to be expanded.

Advantageously, the apparatus for moulding plastic preforms has several such blow moulds which are arranged on a common carrier such as a carrier wheel. And here it is possible for a plurality of tempering bodies, which are arranged on the various blow moulds, to be supplied with tempering medium from a common channel.

In a further advantageous embodiment, the apparatus includes a blow mould carrier on which the blow moulds are detachably fixed. Advantageously, when the blow mould is detached from the blow mould carrier, said tempering body is not released at the same time but preferably remains on the blow mould carrier or in a predetermined position with regard to the blow mould carrier.

A tempering body is generally understood to be a body which tempers another element such as here an area of the blow mould or of a neck plate, which preferably means that it changes at least locally the temperature thereof or keeps it at a certain level. In this connection, a temperature value is particularly to be changed relative to other areas of the blow mould or is to be kept on a different level.

Advantageously, the tempering body is a heat sink for cooling said area of the blow mould. However, in other applications it would also be conceivable for the tempering body to be a heating body that heats for example a central area of the blow mould.

In a further advantageous embodiment, the tempering body has at least one channel for a tempering medium. In particular, this is a coolant channel wherein two connections for supplying the tempering body with the tempering medium are provided on a tempering body. Advantageously, this channel extends completely within the tempering body. Further, this channel advantageously includes curved areas and is further advantageously not produced by means of a drilling process. Curved areas are understood to mean here, in order to distinguish it from square areas, in particular such areas with a finite radius of curvature.

In an advantageous design, the area of the blow mould, which is to be tempered, is a neck area of the blow mould. The neck area is understood to mean that area of the blow mould, which is arranged in the area of the mouth of a preform to be expanded. In particular, the area of the blow mould, which is to be tempered, cools an area immediately below a thread or carrying ring of a preform to be expanded.

Advantageously, on at least one blow mould unit and preferably on both blow mould units, a neck plate is mounted. These neck plates may here be screwed onto the blow mould parts. However, it would also be conceivable for the neck plates to be formed in one piece with the blow mould parts.

Advantageously (in particular during a working operation of the apparatus), an areal contact exists at least periodically between the tempering body and the blow mould. Thus, the blow mould or the neck plate is cooled here across said area and not via channels. It is noted here that within the context of the present invention, the neck plate is regarded as a component of the blow mould. Particularly preferably this is the area to be tempered or to be cooled around the neck plate or part of this neck plate. This neck plate may here be arranged in an upper area of the above-mentioned blow mould parts. Therefore, an areal contact between the tempering body and a top surface of the blow mould is formed.

In a further advantageous embodiment, the tempering body is movable relative to the blow mould during a working operation of the apparatus, i.e. during an operation in which the plastic preforms are expanded. Thus, during the actual expansion process, the tempering body is placed against the blow mould or the neck plate, and at other times, for example when a container is removed, there is advantageously no contact between the tempering body and the neck plate.

In a further advantageous embodiment, a movement of the tempering body is coupled to a movement of the application means. Thus, for example, the tempering body may be located on the application means such as for example on a blow nozzle, and if the blow nozzle is placed on the blow mould or the plastic preform, the tempering body may rest on the neck plate as well.

In a further advantageous embodiment, the apparatus includes a stretching rod for stretching the plastic preforms along the longitudinal direction thereof. In this embodiment, the apparatus is in particular a stretch blow moulding machine. Particularly with this type of apparatus, a particularly efficient tempering or cooling by said tempering body becomes possible and is particularly advantageous.

In a further advantageous embodiment, the apparatus has a second tempering body, which may advantageously also be separated in its entirety from the blow mould or the neck plate. In this way, in particular both blow mould parts are equipped with such tempering bodies for tempering a neck area. Advantageously, the second tempering body is here located opposite the first tempering body with respect to the plastic preform. Thus, the two tempering bodies may for example be formed to be symmetrical relative to one another and the plastic preform or the neck area thereof may be received between the tempering bodies.

Advantageously here, the two tempering bodies are designed to be the same, which results in a reduction of the manufacturing costs thereof.

It is also possible for part of the bottom mould to be brought into contact with a separate cooling body. Thus, a specific tempering of an area of the plastic container in the bottom section may be achieved, such as for example the so-called injection point at the centre, and the concentric outside area in the container bottom remains unaffected by this.

The present invention is further directed to a method for moulding plastic preforms into plastic containers, wherein the plastic preforms are moulded within a cavity formed by at least two blow mould parts of a blow mould, which are movable relative to each other, by applying pressure onto the plastic preforms. In the course of this, at least one area of the blow mould is tempered. According to the invention, tempering is carried out by means of a tempering body which may be separated from the blow mould in its entirety.

BRIEF DESCRIPTION OF THE DRAWINGS

Further advantages and embodiments will become evident from the attached drawings, wherein.

DETAILED DESCRIPTION OF THE INVENTION

Figure 1:
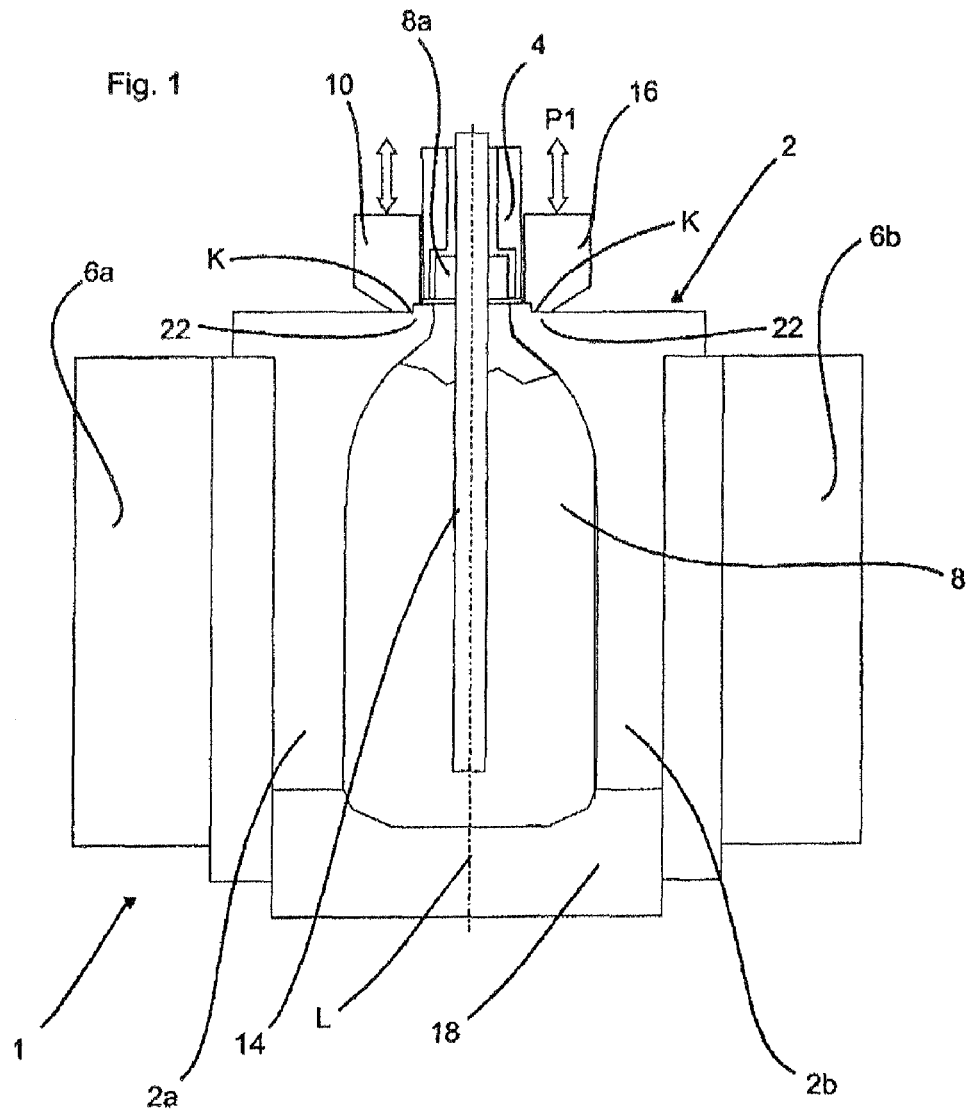
FIG. 1 shows a schematic view of an apparatus according to the invention.

FIG. 1 shows a further schematic view of an apparatus 1 according to the invention. This apparatus 1 for expanding plastic preforms into plastic containers 8 includes here a blow mould 2. This blow mould 2 includes here two blow mould parts or blow mould halves 2a, 2b, which may be folded apart so as to receive the plastic preforms between them. Here, the left-hand blow mould part 2a as shown in FIG. 1 or the left-hand blow mould half is arranged on a blow mould carrier or a carrier half 6a. The right-hand blow mould part or the right-hand blow mould half 2b is fixedly mounted on a blow mould carrier 6b and during a working operation these two carriers 6a and 6b may be pivoted with regard to a common axis which extends parallel to the longitudinal axis L as shown.

Reference numeral 18 relates to a bottom mould which, in order to expand the plastic preforms in any case in one working operation, is advanced here from below up to the two blow mould halves 2a, 2b. In this way, a cavity is completed or formed by the blow mould parts 2a, 2b as well as the bottom mould 18, within which cavity the plastic preforms are expanded.

During the expansion process, the plastic preform is stretched in its longitudinal direction L by means of a stretching rod 14. Reference numeral 22 relates to the area of the blow mould, which is to be tempered. This is here in particular an area which rests against a neck area of the plastic preform or the plastic container 8 or is arranged in the vicinity thereof.

Reference numeral 10 identifies a tempering body and reference numeral 16 a second tempering body in a highly schematic view. These two tempering bodies 10, 16 are here formed in the same manner and are symmetrical to one another. In a further embodiment (not shown), the two tempering bodies may also be formed in one piece and may be arranged concentrically around the blow nozzle. Reference numeral 8a identifies a thread area of the plastic preform which rests against an upper area of the blow mould. Reference numeral 4 relates to a blow nozzle which is placed thereon for expanding the plastic preforms. The movement of the tempering bodies 10 and 16 is here coupled to the movements of the blow nozzle, which means the tempering bodies 10, 16 also move along the double arrow P1 towards the respective blow mould parts 2a and 2b. During expansion, an areal contact K occurs between the two tempering bodies 10, 16 and the blow mould parts 2a and 2b or a neck plate, which is not shown in detail here, which are components of the blow mould 2.

Figure 2:
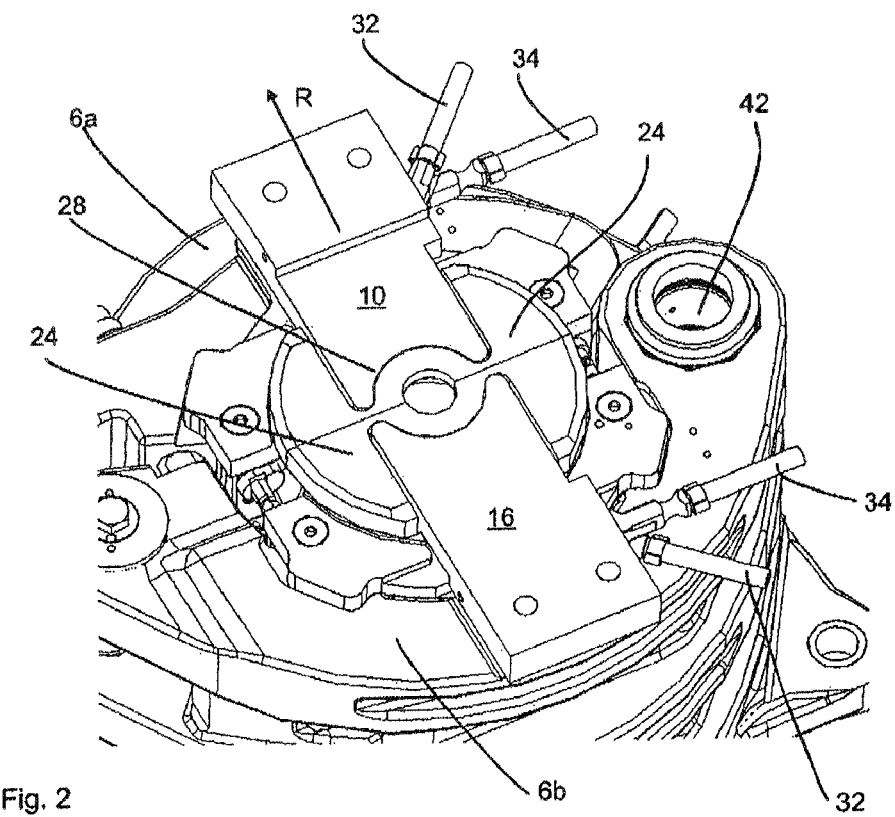
FIG. 2 shows a perspective view of an upper area of a blow mould.

FIG. 2 shows a perspective view of an upper area of an apparatus according to the invention. Here again, the two blow mould carriers 6a and 6b can be seen, on which the two blow mould parts 2a, 2b are mounted. Further, two neck plates 24 which are identified in their entirety with 24 are provided, against which the two tempering bodies 10 and 16 rest. Reference numerals 32 relate here to the inlet for a tempering or cooling medium and reference numeral 34 relates to a corresponding return, however, this may also be implemented the other way round. Reference numeral 42 relates to a pivoting axis which is not shown in more detail herein, in relation to which the two mould carriers 6a or at least one of them may be pivoted in order to open the blow mould in this way.

Figure 3:
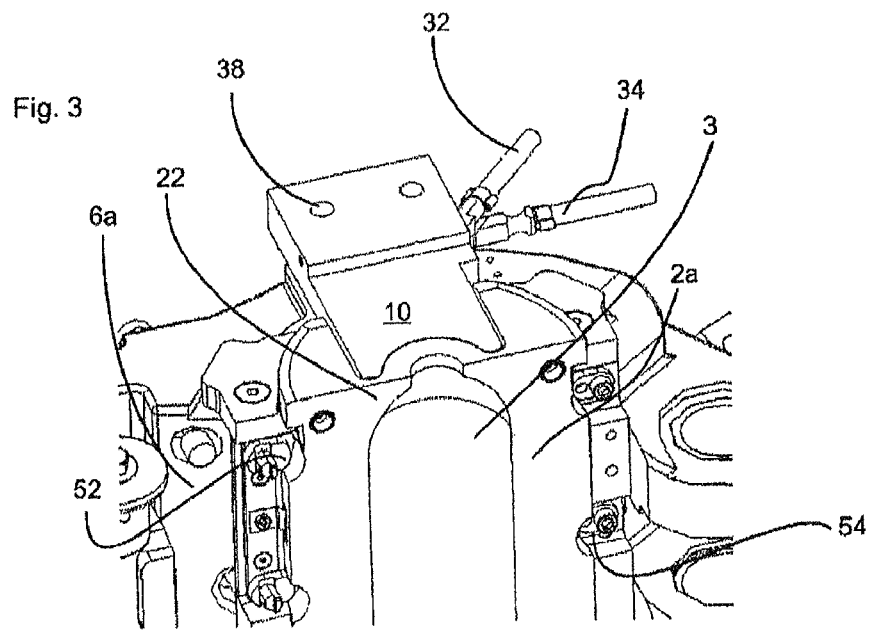
FIG. 3 shows a perspective view of an individual blow mould part.

FIG. 3 shows a view of an individual blow mould half 2a which is located on the blow mould carrier 6a associated therewith. What can be seen here are in particular locking mechanisms such as clamps 54 of the blow mould carrier 6a, which engage in corresponding recesses 52 of the blow mould, in order to hold the same. In this way, a quick-release mechanism between the blow mould half 2a and the blow mould carrier 6a is achieved.

Here, too, the tempering body 10 may be seen, which engages in an area of the blow mould half 2a and again forms an areal contact. The areal contact is formed here preferably both in the radial direction R of the blow mould and in the longitudinal direction L (see FIG. 1), i.e. the respective contact area may extend both vertically to the longitudinal direction L and in the longitudinal direction L. Reference numeral 3 relates to the cavity that is formed within the blow mould half 2a, in order to expand the plastic preform therein. It would also be possible for the sections of the contact area to extend obliquely.

Figure 4:
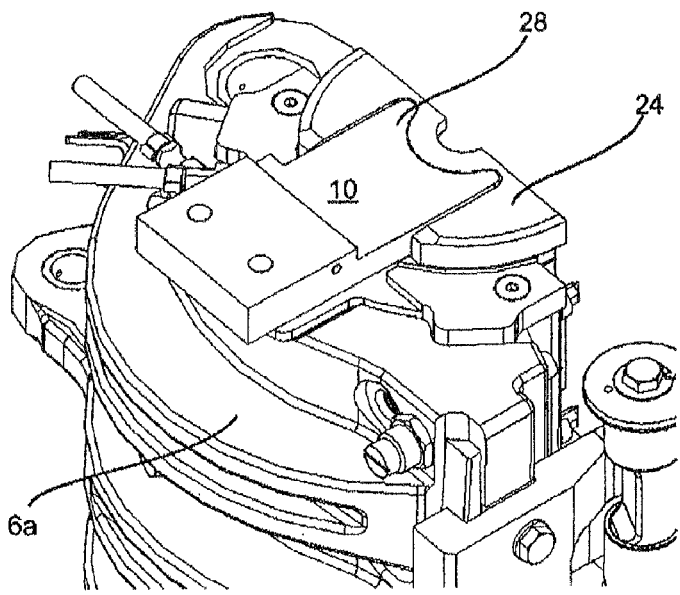
FIG. 4 shows an external view of the blow mould part from FIG. 3.

FIG. 4 shows a view from the rear of the blow mould half shown in FIG. 3, which is located on a blow mould carrier. It can be seen that the tempering body 10 has here a crescent-shaped section 28 which rests against the neck plate 24. In this way, the area of the contact between the tempering body 10 and the neck plate 24 is increased in the areas in which an effective cooling is required.

Figure 5:
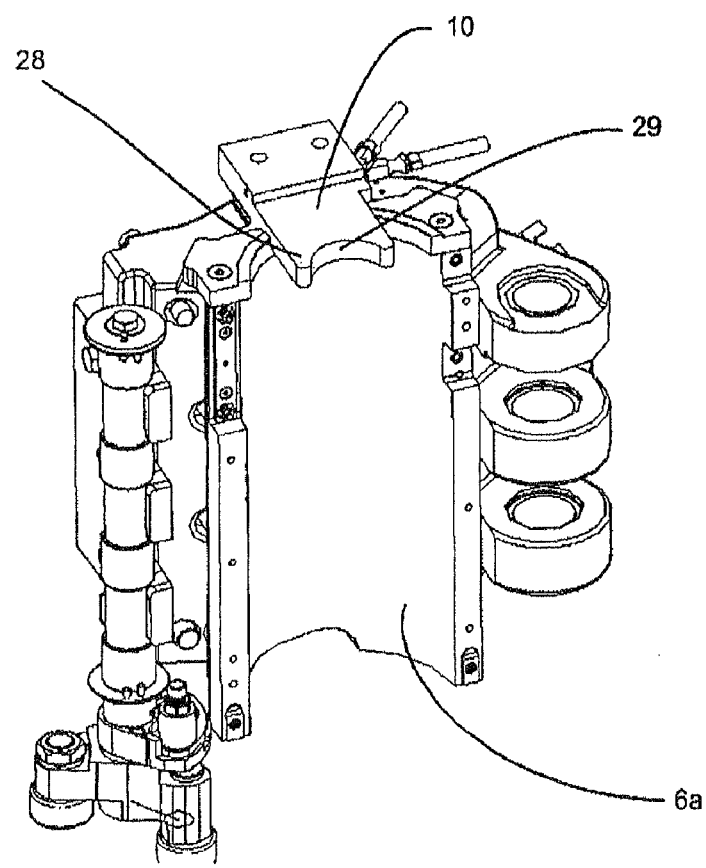
FIG. 5 shows a view of the blow mould carrier with the blow mould removed from it.

FIG. 5 shows a further embodiment of a blow mould carrier, with the associated blow mould half having been removed here. It can be seen that the tempering body 10 is not removed together with the blow mould half, but remains on the blow mould carrier 6a. In this way, it is no longer necessary for the two coolant connections on the tempering body 10 to be replaced when the blow mould is changed. In this way, an automatic changing process with regard to the blow moulds may be improved, since in particular the complex coolant connections do not need to be automatically released and reconnected.

Figure 6:
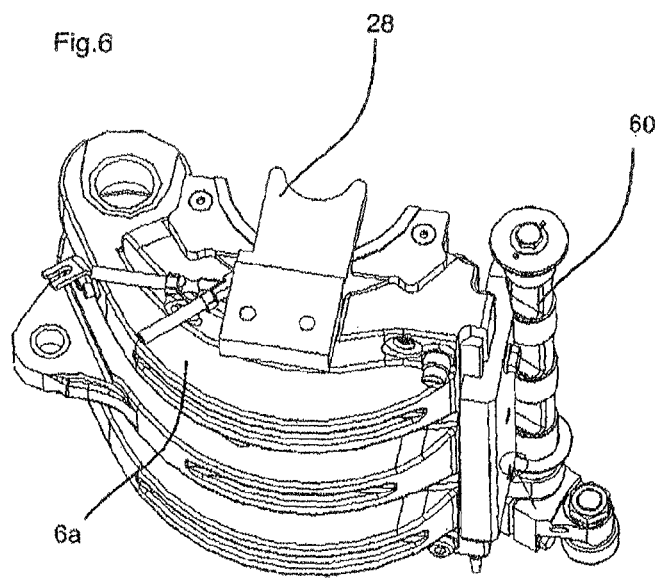
FIG. 6 shows a rear view of the blow mould carrier shown in FIG. 5.

FIG. 6 shows a view from the rear of the arrangement shown in FIG. 5. What can be seen here in particular is also a closure mechanism 60 which during a working operation is used to close the blow mould carrier 6a shown in FIG. 6 with the blow mould carrier 6b (not shown) which is then located opposite to it.

Figure 7:
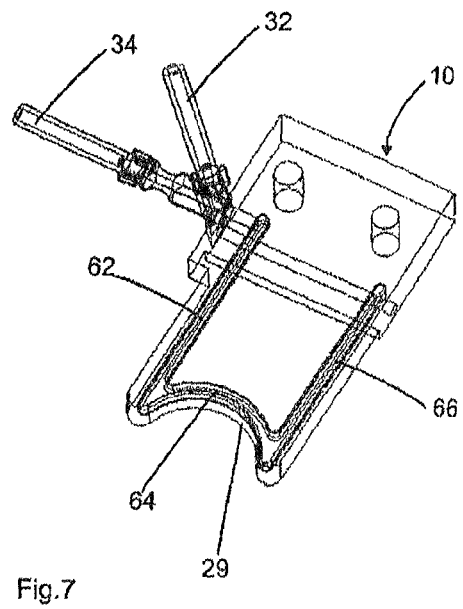
FIG. 7 shows a view of the tempering body.

FIG. 7 shows a view of a tempering body 10. It can be seen that the tempering body has a coolant channel on the inside thereof, which has here portions 62, 64 and 66. Portion 64 is here also formed to be curved and may in this way efficiently cool a contact area 29. In the prior art, these areas are usually implemented to be straight, since they are bores. Thus, advantageously at least a section of a coolant channel is formed on the inside of the tempering body to be curved. Also the plugs for closing the coolant channels, which are at times necessary in the prior art, are no longer necessary in the embodiment shown in FIG. 7.

Figure 8:
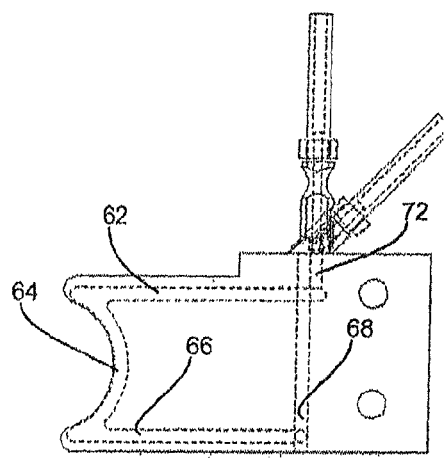
FIG. 8 shows a further view of the tempering body.

FIG. 8 shows a further schematic view of tempering body 10. It can be seen here again that in particular the curved area 64 may be brought very close to the contact area 29 without an exit of coolant having to be feared. However, it would also be possible for the sections 62, 64 and 66 to be selected either wider or narrower in relation to the cross section, depending on requirements, as shown in FIG. 8. Advantageously, a cross section of these coolant channels is between 4 mm and 2 cm.

It would further be possible to provide in the tempering body 10 a sensor device for determining a (local) temperature of the tempering body 10 or of the tempering medium.

Moreover, it would also be possible for an insulating body to be arranged between the tempering body 10 and the neck plate in other areas, so that only those areas of the blow mould are cooled, that are meant to be cooled at that particular time, and apart from that no heat transfer occurs. If desired, the tempering body could also be thermally insulated against certain areas of the blow mould, for example by using special insulating washers. It would be conceivable for the tempering body to cool the neck area of the plastic preform, but to be thermally insulated downwards against the blow mould.

All of the features disclosed in the application documents are claimed as being essential to the invention, in as far as they are novel over the prior art either individually or in combination.

LIST OF REFERENCE NUMERALS

1 Apparatus
2 Blow mould
3 Cavity
2a,2b Blow mould parts, blow mould halves
4 Blow nozzle, application device
6a,6b Blow mould carrier
8 Plastic container
8a Thread area of the plastic container
10 Tempering body
14 Stretching rod
16 Further tempering body
18 Bottom mould
22 Area
24 Neck plate
28 Crescent-shaped section
29 Contact area
32 Inlet
34 Return
42 Pivot axis
52 Recesses
54 Clamps
60 Closing mechanism
62,64,66 Portions of the coolant channels
K Contact area
L Longitudinal direction
P1 Double arrow
R Radial direction

The invention claimed is:

1. An apparatus for moulding plastic preforms into plastic containers, comprising at least one blow mould, within which the plastic preforms can be expanded into plastic containers, wherein the blow mould has at least two blow mould parts which are movable relative to each other, including an application device which is movable relative to the blow mould, in order to apply pressure onto the plastic preform for the expansion thereof, wherein at least one area of the blow mould may be tempered, wherein the apparatus has a tempering body which may be separated from the blow mould in its entirety, in order to temper the area of the blow mould, and wherein a neck plate is located on at least one blow mould part.

2. The apparatus as claimed in claim 1, wherein the tempering body is a heat sink for cooling the area of the blow mould.

3. The apparatus as claimed in claim 1, wherein the tempering body includes a channel for a tempering medium.

4. The apparatus as claimed in claim 1, wherein the tempering body is used for tempering the neck plate.

5. The apparatus as claimed in claim 1, wherein at least at times an areal contact exists between the tempering body and the blow mould.

6. The apparatus as claimed in claim 1, wherein the tempering body is movable relative to the blow mould in a working operation of the apparatus.

7. The apparatus as claimed in claim 1, wherein a movement of the tempering body is coupled to a movement of the application device.

8. The apparatus as claimed in claim 1, wherein the apparatus includes a second tempering body which may be separated from the blow mould in its entirety.

9. A method for moulding plastic preforms into plastic containers, using the apparatus as claimed in claim 1, wherein the plastic preforms are moulded by applying pressure onto the plastic preforms within a cavity that is formed by at least two blow mould parts of a blow mould, which blow mould parts are movable relative to each other, wherein at least one area of the blow form is tempered, wherein tempering is carried out a tempering body that may be separated from the blow mould in its entirety.

10. The method as claimed in claim 9, wherein the tempering body is a heat sink for cooling the area of the blow mould.

11. The method as claimed in claim 9, wherein the tempering body includes a channel for a tempering medium.

12. The method as claimed in claim 9, wherein the tempering body is used for tempering the neck plate.

13. The method as claimed in claim 9, wherein at least at times an areal contact exists between the tempering body and the blow mould.

14. The method as claimed in claim 9, wherein the tempering body is movable relative to the blow mould in a working operation of the apparatus.

15. The method as claimed in claim 9, wherein a movement of the tempering body is coupled to a movement of the application device.

16. The method as claimed in claim 9, wherein the apparatus includes a second tempering body which may be separated from the blow mould in its entirety.

* * * * *